Aug. 20, 1946.　　C. G. VOKES ET AL　　2,406,177
DUST REMOVER AND FILTER
Filed Dec. 21, 1943
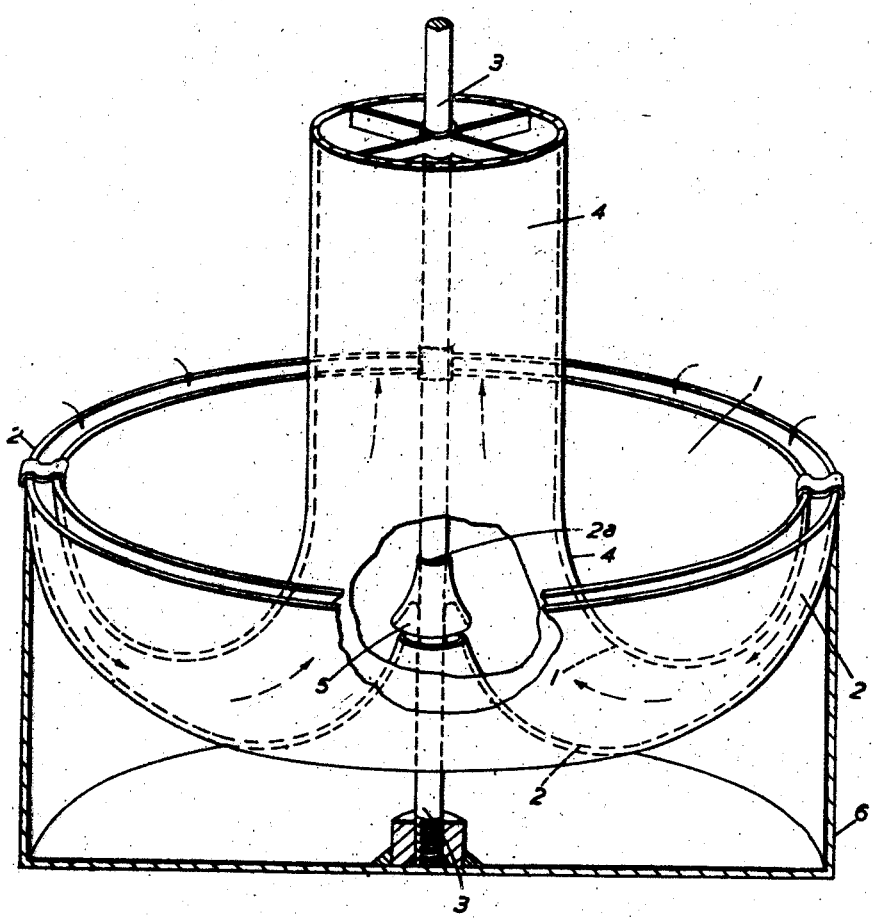
Inventors
Cecil G. Vokes
Edward A. Stokes
By
　　　Attorney Patented Aug. 20, 1946

2,406,177

UNITED STATES PATENT OFFICE 2,406,177

DUST REMOVER AND FILTER

Cecil Gordon Vokes and Edward Arthur Stokes, London, England; said Stokes assignor to Vokes Limited, London, England Application December 21, 1943, Serial No. 515,172
In Great Britain December 14, 1942

3 Claims. (Cl. 183—79)

There are numerous types of apparatus sometimes employed in conjunction with filters, in which dust particles are removed from air (or other gas as will be hereinafter understood when air is mentioned) by centrifugal action. In many cases there is a whirling action about the axis of a circular chamber, by which the dust is thrown towards the outer wall and a layer of air heavily charged with dust can be removed; in other cases a passage of (say) rectangular cross-section is carried round through perhaps 180° before removal of the dust. The present invention provides arrangements in which (from one aspect) the air flows along a passage of annular (including part of an annulus) cross-section which is curved round radially and axially to give the centrifugal action and the walls of which are spaced further apart as it gets nearer to the axis of the annulus so as to preserve a substantially equal cross-sectional area perpendicular to the gas flow. Preferably the inner end of the passage becomes a circle or nearly so and the flow axial, so that if the curvature is about 180° the whole will resemble a hollow stalk with a dished and hollow circular head terminating in an annular opening, surrounding the stalk and of the same cross-sectional area as that of the stalk. The form of the air passage thus provided is substantially that of a vortex caused by a fluid entering a pipe.

Other parts of the invention are embodied in a typical form shown upon the accompanying drawing, the parts of the invention for which a monopoly is desired being those delimited by the claims.

The drawing is a perspective view, partly broken away and shows a typical form in which the flow is (as generally preferred) inward towards the centre. The inner and outer walls 1, 2 of the air passage are formed of annularly dished bowls of which the outer or larger 2 terminates at the centre in a point or a small circle at 2a attached to a central assembly rod 3 and the inner or smaller 1 merges into a central cylindrical outlet tube 4. At a suitable distance from the centre of the outer bowl is a circular lip or dust trap 5 and the two bowls are so shaped and assembled that the cross-sectional area of the annulus perpendicular to the flow is the same as that of the outlet tube. The air will then enter the passage as indicated by arrows between the rims of the two bowls and after being carried round preferably at least 180°, the cleaned air will pass up the outlet tube. The dust deflected by the lip or trap 5 can be collected in a dust box 6 fitted below the outer bowl. If the device is to be used inverted, the assembly rod can be replaced by a tube to carry the dust to a box beneath the cleaner, as will be apparent without illustration.

In some cases the flow can be reversed and the lip or trap located at the rim, as will also be apparent.

It will be noted that the suggested manner of assembly from two bowls and a central rod or tube makes it very simple to arrange for dismantling and cleaning.

We claim:

1. In an air cleaner of the centrifugal type, a tube through which air is exhausted upwardly, the lower end of said tube being flared back substantially 180 degrees, said flared portion beginning and terminating in a common plane normal to the axis of said tube, means forming a wall spaced along said axis from the flared end of said tube, said wall and flared end having their outer edges spaced and substantially concentric of said axis, said spacing gradually increasing toward said axis, said wall terminating inwardly in an aperture within said tube below said plane, a deflector cap positioned above said aperture and overlapping the periphery thereof, and a dust receptacle fitted to said wall and extending below said aperture.

2. A gas cleaner including a support, two annularly dished members carried by the support one within the other, the dished areas of the members being spaced apart to define a curved gas flow passage of equal area perpendicular to the flow throughout, the outer margins of the members being spaced apart to define an annular inlet to such passage, the inner member being axially formed to provide an outlet passage for the gas flow, and a gas trap in line with such outlet passage and immediately adjacent the dished surface area of outer member, to thereby interrupt the gas flow in said passage on the outer margin of the curved passage to collect the dust directed into such margin.

3. A construction as defined in claim 2, wherein the member with which the trap co-operates is formed with an axial opening to permit discharge beyond the curved gas-flow passage of the matter collected by the trap.

CECIL GORDON VOKES.
EDWARD ARTHUR STOKES.